(12) United States Patent
Suzuki

(10) Patent No.: US 8,684,539 B2
(45) Date of Patent: Apr. 1, 2014

(54) SEMICONDUCTOR LIGHT SOURCE DEVICE, SEMICONDUCTOR LIGHT SOURCE CONTROL METHOD, AND PROJECTION APPARATUS

(75) Inventor: Hideo Suzuki, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 337 days.

(21) Appl. No.: 13/209,528

(22) Filed: Aug. 15, 2011

(65) Prior Publication Data

US 2012/0050697 A1 Mar. 1, 2012

(30) Foreign Application Priority Data

Aug. 24, 2010 (JP) ................................. 2010-187236

(51) Int. Cl.
| | |
|---|---|
| G03B 21/20 | (2006.01) |
| G08B 21/00 | (2006.01) |
| G01R 31/08 | (2006.01) |
| H05B 37/00 | (2006.01) |
| H05B 39/00 | (2006.01) |
| H05B 41/00 | (2006.01) |

(52) U.S. Cl.
USPC ............. 353/85; 315/185 R; 324/522; 34/650

(58) Field of Classification Search
USPC ........ 353/85, 121–122; 315/185 R, 189–190, 315/307, 310, 312, 315, 299; 324/500, 324/522–523, 525–526; 340/650–651
See application file for complete search history.

(56) References Cited

U.S. PATENT DOCUMENTS

| | | | | |
|---|---|---|---|---|
| 7,425,943 B2* | 9/2008 | Furukawa | ...................... | 345/102 |
| 7,538,497 B2* | 5/2009 | Furukawa | ...................... | 315/291 |
| 8,274,237 B2* | 9/2012 | Nagase et al. | ................. | 315/247 |
| 2007/0096746 A1* | 5/2007 | Telefont | ......................... | 324/500 |
| 2010/0156324 A1* | 6/2010 | Nagase et al. | ................. | 315/307 |
| 2012/0013479 A1* | 1/2012 | Chan et al. | ................ | 340/815.45 |
| 2012/0050697 A1 | 3/2012 | Suzuki | | |
| 2012/0098430 A1* | 4/2012 | Inoue et al. | ...................... | 315/82 |
| 2013/0099670 A1* | 4/2013 | Jin | ................................ | 315/120 |
| 2013/0265056 A1* | 10/2013 | Lin | ............................... | 324/414 |

FOREIGN PATENT DOCUMENTS

| | | |
|---|---|---|
| JP | 2007-165441 A | 6/2007 |
| JP | 2012-49178 A | 3/2012 |
| KR | 100922336 B1 | 10/2009 |

OTHER PUBLICATIONS

Korean Office Action dated Jan. 28, 2013 (and English translation thereof) in counterpart Korean Application No. 10-2011-0083872.
Japanese Office Action dated Oct. 8, 2013 (and English translation thereof) in counterpart Japanese Application No. 2012-171419.

* cited by examiner

Primary Examiner — Tony Ko
Assistant Examiner — Jori S Reilly-Daikun
(74) Attorney, Agent, or Firm — Holtz, Holtz, Goodman & Chick, PC

(57) ABSTRACT

There is provided a semiconductor light source device including a plurality of semiconductor light source elements connected in series, a drive circuit configured to drive the semiconductor light source elements, a plurality of resistors, each of which is connected in parallel with one of the semiconductor light source elements, respectively, and a determination unit configured to determine the number of elements short-circuited in the semiconductor light source elements based on voltages applied to the resistors when driving of each of the semiconductor light source elements is being stopped.

18 Claims, 13 Drawing Sheets

US 8,684,539 B2

SEMICONDUCTOR LIGHT SOURCE DEVICE, SEMICONDUCTOR LIGHT SOURCE CONTROL METHOD, AND PROJECTION APPARATUS

CROSS-REFERENCE TO RELATED APPLICATIONS

This application is based upon and claims the benefit of priority under 35 USC 119 of Japanese Patent Application No. 2010-187236 filed on Aug. 24, 2010, the entire disclosure of which, including the description, claims, drawings, and abstract, is incorporated herein by reference in its entirety.

BACKGROUND OF THE INVENTION

1. Field of the Invention

The present invention relates to a semiconductor light source device, a semiconductor light source control method, and a projection apparatus which are suitable for an apparatus that uses, for example, a plurality of semiconductor light source elements, such as LEDs, connected in series.

2. Description of the Related Art

To detect an abnormality in a plurality of semiconductor light sources connected in series, various proposals, including Jpn. Pat. Appln. KOKAI Publication No. 2007-165441, have been made.

FIG. 13 shows a general configuration of a circuit that drives a plurality of light-emitting diodes (LEDs) connected in series and detects an abnormality (short circuit), including the techniques written in the above patent document. In FIG. 13, for example, four LEDs 10A to 10D are connected in series to constitute light source unit 10 to be driven. An operating power supply voltage Vin is applied to the anode of LED 10A of the light source unit 10. The operating power supply voltage Vin is also applied to a drive circuit 11 that drives the light source unit 10.

The drive circuit 11, which is also connected to the cathode of the LED 10D, adjusts the voltage and current of the light, source unit 10 to drive the light source unit 10 in an intended light quantity.

The voltage between both ends of LEDs 10A to 10D of the light source unit 10, that is, between the anode of LED 10A and the cathode of LED 10D, is detected by a voltage monitoring circuit 12. The voltage detected by the voltage monitoring circuit 12 is stepped down at a predetermined rate with a level shifter 13, which then sends the stepped-down voltage to a control circuit 14.

The control circuit 14 determines the number of LEDs short-circuited in the light source unit 10 according to the output level of the level shifter 13. Then, the control unit 14 sends a control, signal corresponding to the determination result to the drive circuit 11, causing the drive circuit 11 to adjust the voltage and current of the light source unit 10 as described above.

The power supply voltage range handled by the control circuit 14 differs so greatly from the voltage range of a driving power supply which is necessary to drive the light source unit 10 and is detected by the voltage monitoring circuit 12 that the control circuit 14 usually cannot receive the output of the voltage monitoring circuit 12 directly. Therefore, the level shifter 13 is inserted between the voltage monitoring circuit 12 and the control circuit to perform voltage matching.

With the above circuit configuration, the voltage monitoring circuit 12 detects the voltage between both ends of the light source unit 10 connected in series. From the voltage stepped down by the level shifter 13, the control circuit 14 determines the number of LEDs that are not short-circuited and are probably emitting light effectively in the light source unit 10 and outputs the determination result as a control signal to the drive circuit 11.

In a circuit as shown in FIG. 13, the LEDs 10A to 102 constituting the light source unit 10 differ greatly in drive characteristic from one LED to another. The LEDs 10A to 10D also differ greatly in operating voltage Vop from LED to LED. Therefore, even if a short circuit has occurred in a part of the LEDs constituting the light source unit 10, it is not easy to detect an abnormality from a fluctuation in the driving voltage between both ends of the light source unit. This becomes more prominent as the number of LEDs connected in series becomes larger.

Specifically, if the operating voltage of an LED is Vop, a variation in the original operating voltage of each LED is ΔVop, the number of LEDs connected in series is n, and the number of LEDs short-circuited is m, when the expression $$m \times \text{Vop (min)} < n \times \Delta \text{Vop(max)}$$

holds in design, the magnitude ratio between the minimum (min) total operating voltage of the light source unit 10 in a normal operation and the maximum (max) total operating voltage of the light source unit 10 in an abnormal operation with a short-circuit having partly occurred is reversed. Therefore, it is impossible to set a threshold voltage for detecting abnormality and therefore abnormality cannot be detected by this method.

At present, various characteristics of LEDs, including operating voltages, differ greatly from one LED to another. The operating voltage might change significantly, depending on temperature or driving current, and therefore the aforementioned mismatch can take place easily.

To overcome such a problem, use of a circuit configured as shown in FIG. 14 in place of the circuit configuration of FIG. 13 can be considered. Specifically, in FIG. 14, voltage monitoring circuits 12A to 12D are provided for the LEDs 10A to 10D, respectively. The voltages detected by the voltage monitoring circuits 12A to 12D are stepped down by the level shifters 13A to 13D respectively, which then output the stepped-down voltages to a control circuit 14'.

As described above, as many voltage monitoring circuits 12A to 12D and level shifters 13A to 13D as LEDs 10A to 10D are provided so as to detect a short circuit in each of the LEDs 10A to 109 constituting the light source unit 10. This enables a fluctuation in the voltage in a normal operation and that in short-circuiting to be detected reliably and therefore a short-circuited LED to be determined.

However, the configuration of FIG. 14 is not practical because the number of parts of the detection circuit, including as many voltage monitoring circuits 12A to 12D and level shifters 13A to 13D as LEDs 10A to 10D, increases, resulting in a great disadvantage in terms of circuit size and production cost.

BRIEF SUMMARY OF THE INVENTION

According to one aspect of the present invention, there is provided a semiconductor light, source device comprising: a plurality of semiconductor light source elements connected in series; a drive circuit configured to drive the semiconductor light source elements; a plurality of resistors, each of which is connected in parallel with one of the semiconductor light source elements, respectively; and a determination unit configured to determine the number of elements short-circuited in the semiconductor light source elements based on voltages applied to the resistors when driving of each of the semiconductor light source elements is being stopped.

According to another aspect of the present invention, there is provided a method of controlling a semiconductor light source device that includes a plurality of semiconductor light source elements connected in series and a drive circuit configured to drive the semiconductor light source elements, the method comprising: connecting each of a plurality of resistors in parallel with one of the semiconductor light source elements, respectively; and determining the number of elements short-circuited in the semiconductor light source elements based on voltages applied to the resistors when driving of each of the semiconductor light source elements is being stopped.

According to still another aspect of the present invention, there is provided a projection apparatus comprising: a light source configured to perform light-emitting driving of a plurality of semiconductor light source arrays in time division each of which includes a plurality of semiconductor light source elements connected in series and emits light of a different color; an input unit configured to input an image signal; a projection unit configured to cause a display element to display an image based on an image signal input by the input unit, cause the display element to reflect or transmit light of a plurality of colors input from the light source in time division so as to form a color optical image, and project the optical image onto a projection object; a plurality of resistors, each of which is connected in parallel with one of the semiconductor light source elements included in each of the semiconductor light source element arrays, respectively; and a plurality of determination units configured to determine the number of elements short-circuited in the semiconductor light source elements based on voltages applied to the resistors when driving of each of the light source element arrays is being stopped; and a projection control unit configured to adjust at least one of the light source and the projection unit according to a determination result at the determination units.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

First Embodiment

Hereinafter, a first embodiment of the invention will be explained in detail with reference to the accompanying drawings.

Figure 1:
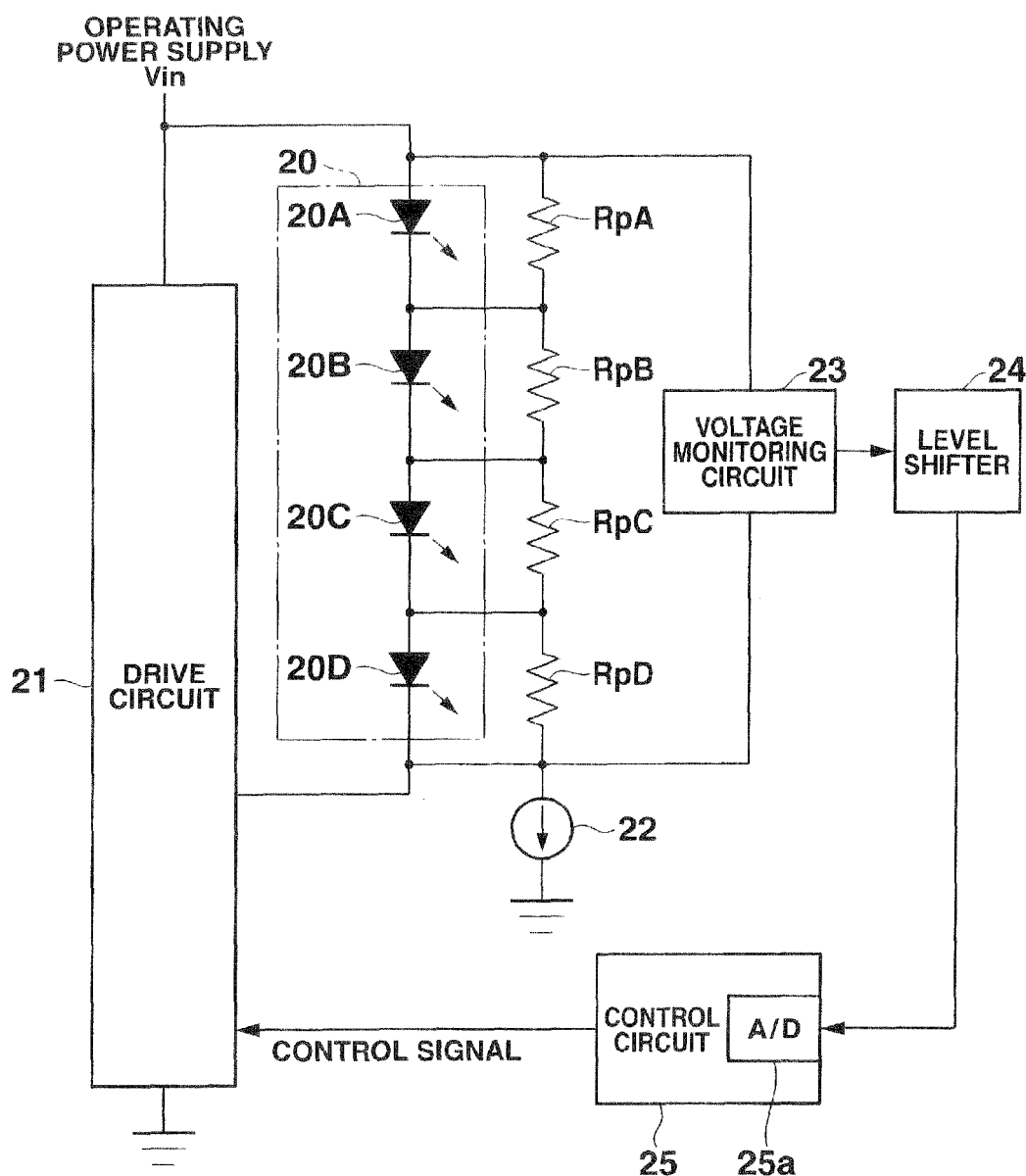
FIG. 1 shows a circuit configuration of a light source device according to a first embodiment of the invention.

FIG. 1 shows a circuit configuration of a light source device that drives a plurality of LEDs connected in series and detects a short circuit. In FIG. 1, a light source unit 20 to be driven includes a plurality of LEDs, for example, four LEDs 20A to 20D, connected in series. An operating power supply voltage Vin is applied to the anode of LED 20A of the light source unit 20. The operating power supply voltage Vin is also supplied to a drive circuit 21 that drives the light source unit 20.

The drive circuit 21, which is also connected to the cathode of LED 20D of the light source unit 20, adjusts the voltages and currents of LEDs 20A to 20D so as to drive the light source unit 20 in an intended light quantity.

Resistors RpA to RpD are connected in parallel with LEDs 20A to 20D of the light source unit 20, respectively. A constant current source 22 for causing a constant current to flow in these RpA to RpD is connected between the bottom resistor RpD and the ground potential.

Then, the voltage between both ends of LEDs 20A to 20D and between both ends of resistors RpA to RpD, that is, between the anode of LED 20A and the cathode of LED 20D, is detected by a voltage monitoring circuit 23. The voltage detected by the voltage monitoring circuit 23 is stepped down at a predetermined rate with a level shifter 24, which then sends the stepped-down voltage to a control circuit 25.

In the control circuit 25, an analog-to-digital conversion unit 25a digitizes the output voltage of the level shifter 24. According to the voltage, the control circuit 25 determines the number of LEDs short-circuited in the light source unit 20. Then, the control circuit 25 sends a control signal corresponding to the determination result to the drive circuit 21. According to the control signal received from the control circuit 25, the drive circuit 21 adjusts the voltage and current of the light source unit 20 as described above.

Next, an operation of the light source device will be explained.

In a state where the drive circuit 21 is not driving the light source unit 20 to emit light, when the constant current source 22 causes current to flow in resistors RpA to RpD, the current generates a certain voltage across each of resistors RpA to RpD.

The voltages generated between both ends of resistors RpA to RpD are also applied to LEDs 20A to 20D, semiconductor light source elements connected in parallel, respectively. The resistances of resistors RpA to RpD and the current of the constant current source 22 are set such that a voltage applied to each of LEDs 20A to 20D when the constant current source 22 supplies a current to resistors RpA to RpD is lower than an operating threshold voltages generally called forward drop voltage Vf of each of LEDs 20A to 20D, taking into account variations in the electric characteristics of the LEDs used and voltage fluctuations due to the change of use conditions, including use environment temperature. By so doing, only very small current will flow in LEDs 20A to 20D.

At the same time, if the current supplied by the constant current source 22 has been set sufficiently larger than the very small current flowing in LEDs 20A to 200 at this time, the current from the constant current source 22 can be considered to flow almost only in resistors RpA to RpD.

Therefore, the voltages generated between both ends of resistors RpA to RpD are determined only by the resistances of resistors RpA to RpD and the setting of the current of the constant current source 22. The voltage accuracy is determined by the accuracy of resistors RpA to RpD and that of the constant current source 22.

The accuracy of the resistances and that of the supplied current of the constant current source are one digit or two digits higher than a variation in the accuracy of each of LEDs 20A to 20D. Therefore, the voltage between both ends of the light source unit 20 can be detected with a high accuracy as the sum total of the voltages generated between both ends of resistors RpA to RpD by the voltage monitoring circuit 23 without being affected by variations in LEDs 20A to 20D.

Accordingly, if, for example, one of LEDs 20A to 20D constituting the light, source unit 20 is short-circuited, the voltage between both ends of the light source unit 20 detected by the voltage monitoring circuit 23 drops as much as corresponds to one resistor Rp. Therefore, it is possible to detect a failure due to a short circuit in the light source unit 20 reliably.

To sum up, a short circuit in the light source unit 20 can be detected reliably by making the constant current source 22 cause suitable current to flow in resistors RpA to RpD when the light source unit 20 is not operating, i.e., when driving of each of LEDs 20A to 20D is being stopped, and by causing the voltage monitoring circuit to measure the resulting voltages between both ends of each of resistors RpA to RpD.

Here, the suitable current caused to flow by the constant current source 22 must have so small a current that the voltages generated between both ends of resistors RpA to RpD connected in parallel with the light source unit 20 as a result of the current flowing therein do not exceed the operating threshold voltage even if being applied to the light source unit 20 and the light source unit 20 stops short of emitting light and must have so large a current that the voltages between both ends of resistors RpA to RpD do not fluctuate significantly due to leak current flowing through the light source unit 20 when the voltages generated across resistors RpA to RpD are applied to the light source unit 20. That is, when currents supplied to LEDs 20A to 20D vary due to a variation in the accuracy of each of LEDs 20A to 20D, use environment temperature, or unexpected voltage variations, the voltage applied to both ends of each of resistors RpA to RpD varies. In the first embodiment, the current flowed by the constant current source 22 is set such that the voltage applied to all of the LEDs 20A to 20D is higher than a voltage in which (i) the largest value of variations in the voltages applied to the resistors and (ii) the number of the LEDs connected in series are multiplied.

Hereinafter, an explanation will be given using concrete numeric values.

Figure 2:
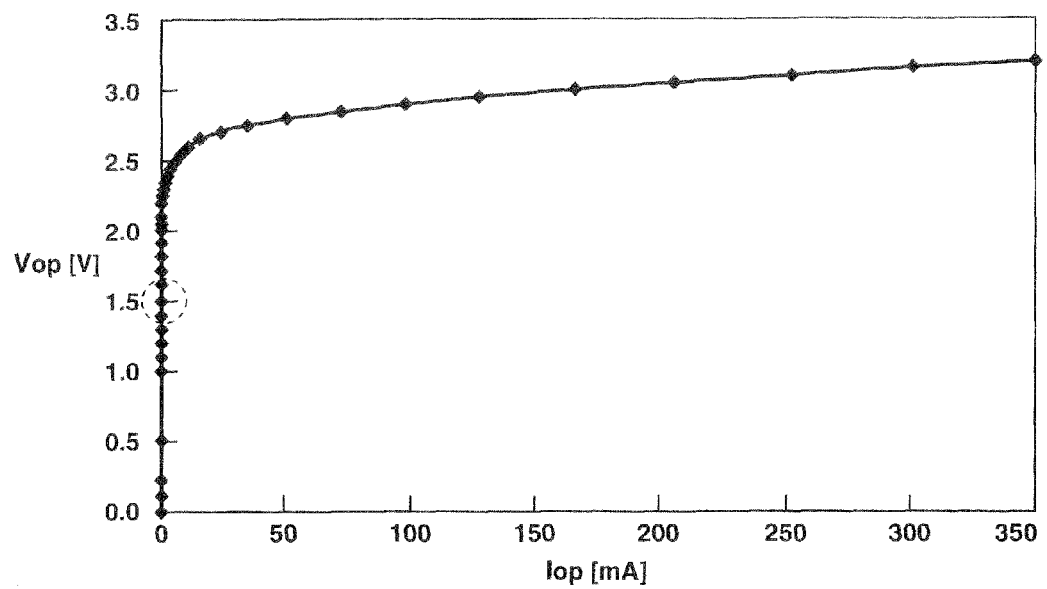
FIG. 2 is a diagram showing the relationship between an operating current and an operating voltage in a high-output LED according to the first embodiment.
Figure 3:
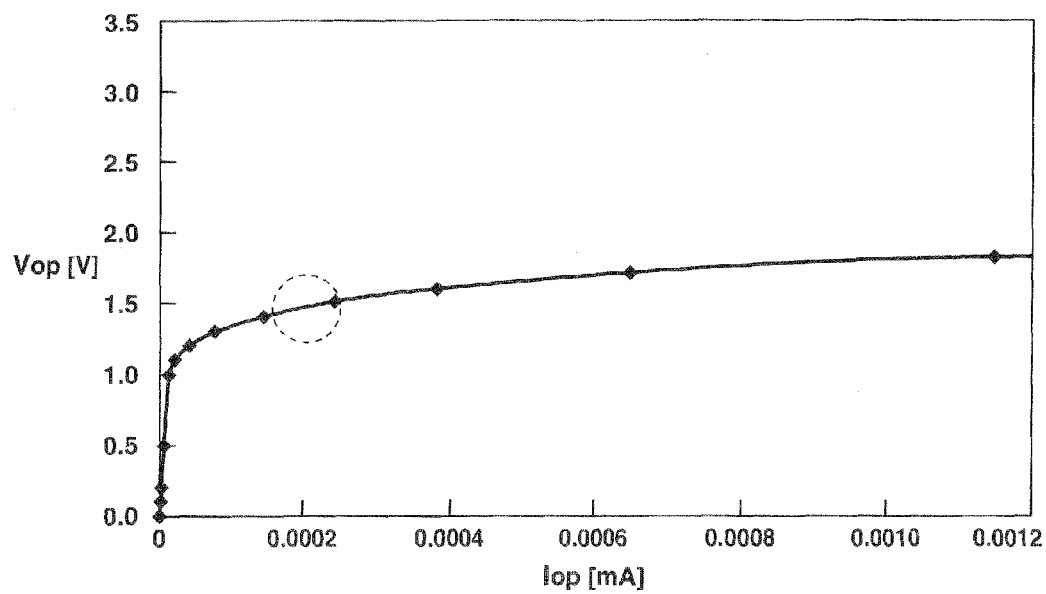
FIG. 3 is a diagram enlarging a part of FIG. 2 of the first embodiment.

FIG. 2 shows a characteristic of an operating voltage Vop with respect to an operating current Iop of LED 20A (to 20D). FIG. 3 shows a low current part of FIG. 2 enlarged in a direction of current or horizontal axis.

In FIG. 2, since the operational threshold voltages of LEDs 20A to 20D are higher than 2 V, a voltage between both end of resistor RpA (to RpD) used to detect a short circuit is set to, for example, 1.5 V.

When 1.5 V is applied to each of resistors RpA to RpD, currents flowing in LEDs 20A to 20D are about 0.23 μA from FIG. 3. Therefore, the current of the constant current source 22, used to detect a short circuit with a sufficient margin is set to, for example, 1 mA.

As a result of calculations with the above setting, the resistance of each of resistors RpA to RpD is 1.5 kΩ and the voltage between both ends of the light source unit 20 in a normal operation is 6.0 V (=1.5 V×4).

When a short circuit has occurred in one LED of the light source unit 20, the voltage between both ends of the light source unit 20 is 1.5 V (=1.5 V×3), which is lower than in a normal operation by 1.5 V. This assures a sufficient potential difference of 1.5 V for comparison and therefore a short circuit can be detected reliably.

For example, even if 0.23 μA, the current flowing in one LED at 1.5 V, has been almost centupled in fluctuation for various reasons, the voltage between both ends of the light source unit 20 in a normal operation is 5.86 V (=1.466 V×4). Therefore, the difference corresponding to 1.5 V in the short-circuiting is 1.36 V, assuring a sufficient potential difference for comparison.

As described above in detail, with the light source device of the first embodiment, short circuit in semiconductor light source elements connected in series can be detected reliably even it the circuit configuration is made as simple as possible.

The following is an explanation of a configuration where the light source unit 20 and its peripheral circuitry shown in FIG. 1 is used as a light source of a Digital Light Processor (DLP) (registered trademark) data projector apparatus.

Figure 4:
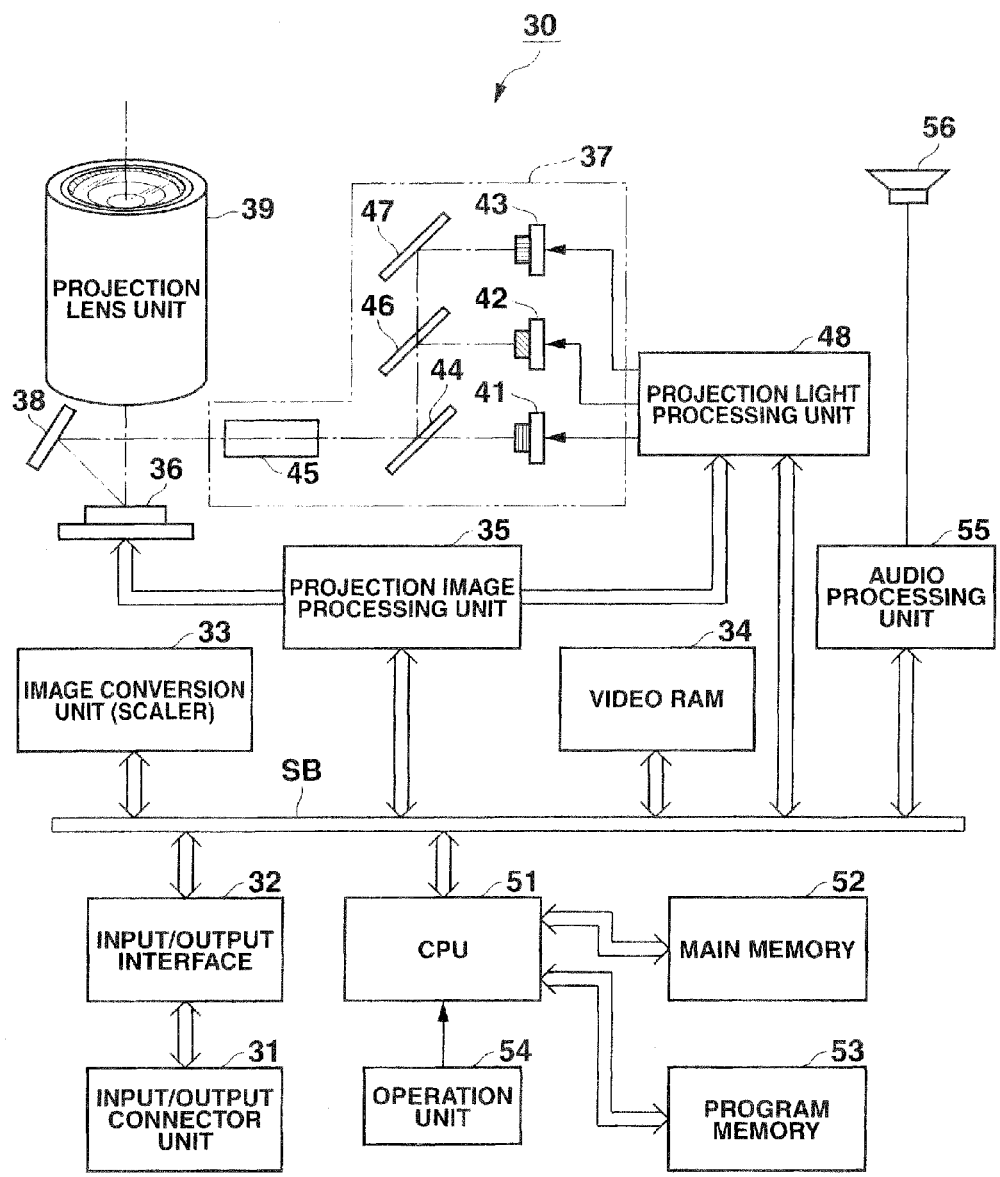
FIG. 4 is a block diagram showing a circuit configuration of a data projector using a light source according to the first embodiment.

FIG. 4 is a block diagram showing a schematic functional configuration of a data projector apparatus 30 according to the first embodiment. Numeral 31 indicates an input/output connector unit, which includes, for example, a pin jack (RCA) type video input terminal, a D-sub15 type RGB input terminal, and a Universal Serial Bus (USB) connector.

Image signals complying with various standards input by the input/output connector unit 31 pass through an input/output interface (I/F) 32 and a system bus SB and input to an image conversion unit 33 generally called a scaler.

The image conversion unit 33 standardizes input image signals into image signals in a predetermined format suitable for projection, writes the standardized image signals into a video RAM 34, a display buffer memory, reads the written image signals from the video RAM 34, and sends the image signals to a projection image processing wilt 35.

According to an image signal received, the projection image processing unit 35 drives a micromirror element 36 as a spatial light modulation element (SLM), by higher speed time-division driving at a frame rate following a predetermined format achieved by multiplying, for example, 60 frames/second by the number of divisions of color components and the number of display gradations.

The micromirror element 36 performs on/off control of the inclination angle of each of a plurality of micro mirrors arranged in an array, for example, an extended graphic array (XGA) (1024 pixels×768 pixels), thereby forming an optical image by the reflected light.

The light source unit 37 emits B, G, B primary color lights in time division cyclically. The primary color lights from the light source unit 37 are reflected totally by a mirror 38 and casted on the micromirror element 36.

Then, the reflected light from the micromirror element 36 forms an optical image. The formed optical image passes through a projection lens unit 39 and is casted on a screen (not shown) serving as a projection object, thereby displaying the optical image.

The light source unit 37 includes a light-emitting diode array that emits red (R) light (hereinafter, referred to as R-LED array) 41, light-emitting diode array that emits green (G) light (hereinafter, referred to as G-LED array) 42, and a light-emitting diode array that emits blue (B) light (hereinafter, referred to as B-LED array) 43.

Each of R-LED array 41, G-LED array 42, and B-LED array 43 includes a plurality of, for example, four, LEDs connected in series as the light source unit 20 of FIG. 1.

Red light emitted by R-LED array 41 passes through a dichroic mirror 44, is made into a beam whose luminance distribution is almost uniform by an integrator 45, and then is sent to the mirror 38.

Green light emitted by G-LED array 42 is reflected by the dichroic mirror 46, is further reflected by dichroic mirror 44, and is sent to the mirror 38 via the integrator 45.

Blue light emitted by B-LED array 43 is reflected by a mirror 47, passes through the dichroic mirror 46, is reflected by the dichroic mirror 44, and is sent to the mirror 38 via the integrator 45.

The dichroic mirror 44 allows red light to pass through but reflects green light and blue light. The dichroic mirror 46 reflects green light but allows blue light to pass through.

A projection light processing unit 48 performs overall control of light-emitting timing of LED arrays 41 to 43 of the light source unit 37, the waveforms of drive signals, and others. The projection light processing unit 48 includes the drive circuit 21, constant current source 22, resistors RpA to RpD, voltage monitoring circuit 23, level shifter 24, and control circuit 25 shown in FIG. 1 for each of LED arrays 41 to 43. According to the timing of image data supplied from the projection image processing unit 35 and under the control of the CPU 51, the projection light processing unit 48 controls light-emitting operations of LED arrays 41 to 43.

The CPU 51 controls all the operations of the individual circuits in the data projector apparatus 30. The CPU 51 is connected directly to a main memory 52 and a program memory 53. The input/output interface 32, including a DRAM, functions as a work memory of the CPU 51. The program memory 53, including an electrically rewritable nonvolatile memory, stores an operating program to be run on the CPU 51, various template data, and others. The CPU 51 performs control operations in the data projector apparatus 30 using the main memory 52 and program memory 53.

The CPU 51 carries out various projection operations according to a key operation signal from an operation unit 54.

The operation unit 54 includes a key operation unit provided on the body of the data projector apparatus 30 and a laser light receiving unit that receives infrared 11 ht from a remote controller (not shown) dedicated to the data projector apparatus 30. The operation unit 54 outputs directly to the CPU 51 a key operation signal based on a key operated by the user on the key operation unit or with the remote controller.

The CPU 51 is further connected to an audio processing unit 55 via the system bus SB. The audio processing unit 55, which includes a sound source circuit, such as a PCM sound source, converts audio data given in a projection operation into an analog signal, and drives a speaker unit 56 to amplify the signal so as to produce sound or beep as needed.

Next, an operation of the data projector apparatus 30 will be explained.

Figure 5:
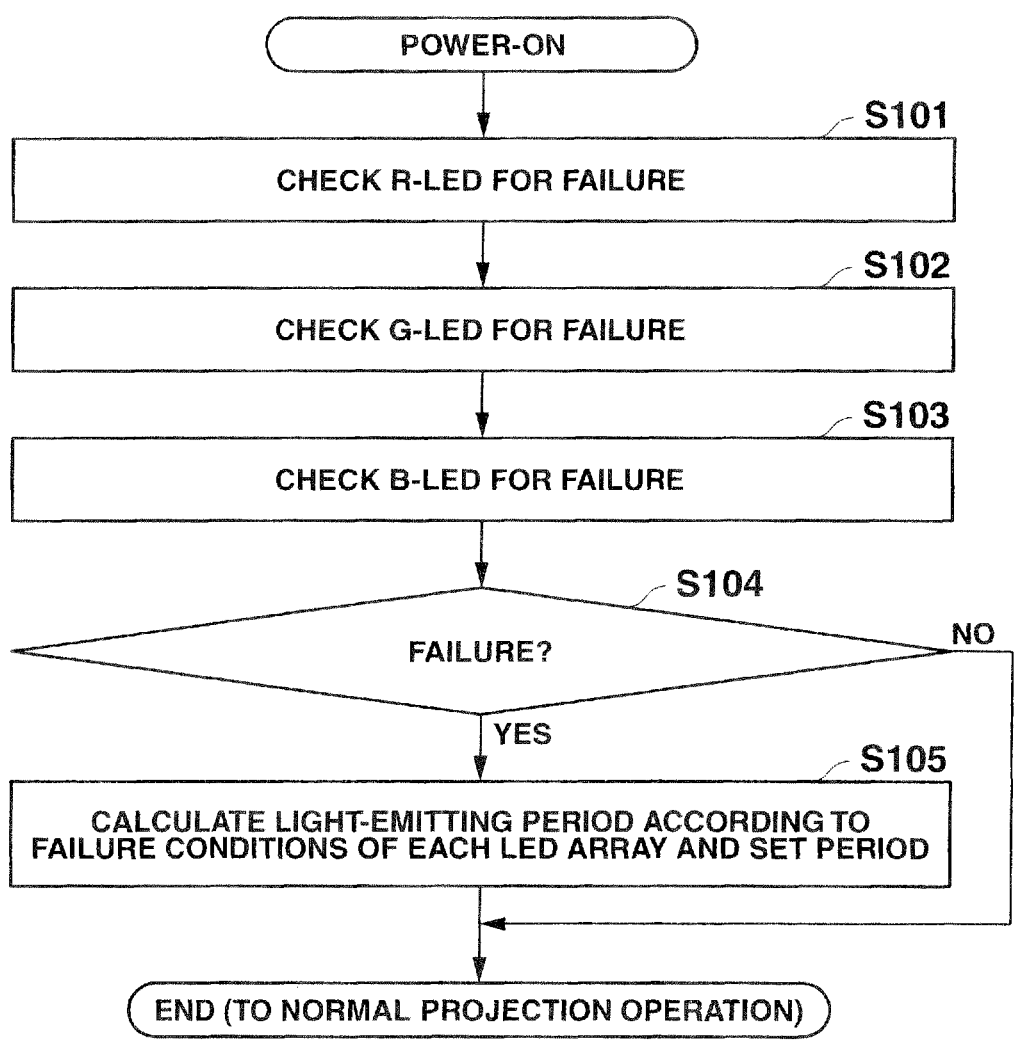
FIG. 5 is a flowchart to explain a part of an initial setting process performed at the time of power-on according to the first embodiment.

FIG. 5 is a flowchart to explain a part of an initial setting process performed at the beginning of power-on of the data projector apparatus 30. The control is performed by the CPU 51 after the CPU 51 has read an operation program, data, and others stored in the program memory 53 and developed them over the main memory 52.

At the beginning of the process, first the CPU 51 checks R-LED array 41 of the light source unit 37 for a failure (step S101).

Specifically, with the light source unit 20 (=R-LED array 41) of FIG. 1 being made unfit, i.e., when driving of each of LEDs 20A to 20D is being stopped, in a failure detection operation, the voltage monitoring circuit 23 in the projection light processing unit 48 detects the voltage between both ends of the light source unit 20, causes the level shifter 24 to step down the detection result, and inputs the stepped-down voltage to the control circuit 25. In the control circuit 25, an analog-to-digital conversion unit 25a digitizes the voltage, enabling the number of elements not short-circuited in the light source unit 20 (41) to be recognized.

After having finished checking R-LED array 41 for a failure, the CPU 51 further checks G-LED array 42 and B-LED array 43 for a failure in the same manner (steps S102, S103).

On the basis of the result of checking R-LED array 41, G-LED array 42, and B-LED array 43 for a failure, the CPU 51 determines whether at least one array has a failure (step S104).

If it has been determined that none of LED arrays 41 to 43 has a failure, the CPU 51 terminates the initial setting process of FIG. 5 and proceeds to a normal projection operation.

Figure 6:
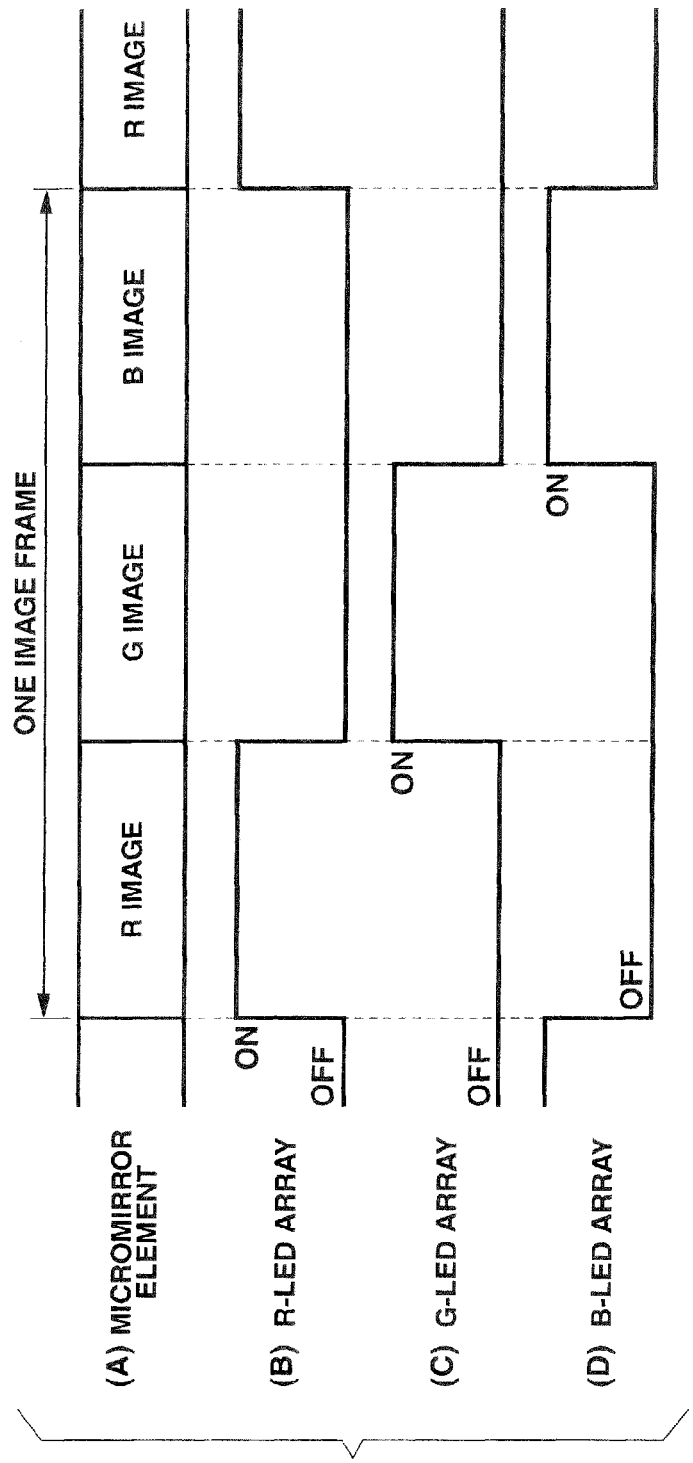
FIG. 6 is a timing chart to explain operation timing of the light source and image display element according to the first embodiment.

FIG. 6 shows an example of the display timing of the micromirror element 36 when none of LED arrays 41 to 43 malfunction and the light-emitting timing of each of LED arrays 41 to 43.

Here, one image frame is composed of a red image field, a green image field, and a blue image field in that order. As shown by (B) to (D) in FIG. 6, P-LED array 41, G-LED array 42, and B-LED array 43 are driven sequentially so as to emit light in a time-division manner with a time ratio of 1:1:1.

The micromirror element 36 displays a red image, a green image, and a blue image sequentially in synchronization with the light-emitting timing of LED arrays 41 to 43 as shown by (A) in FIG. 6. By doing this, optical images formed by the reflected lights are projected by the projection lens unit 39 onto a screen (not shown) serving as a projection object.

If it has been determined in step 3104 that at least one of LED arrays 41 to 43 malfunctions, a light-emitting period is calculated according to the malfunction conditions of LED arrays 41 to 43 and, on the basis of the calculation result, setting is done (step S105). Thereafter, the initial setting process of FIG. 5 is terminated and control proceeds to a normal projection operation.

Figure 7:
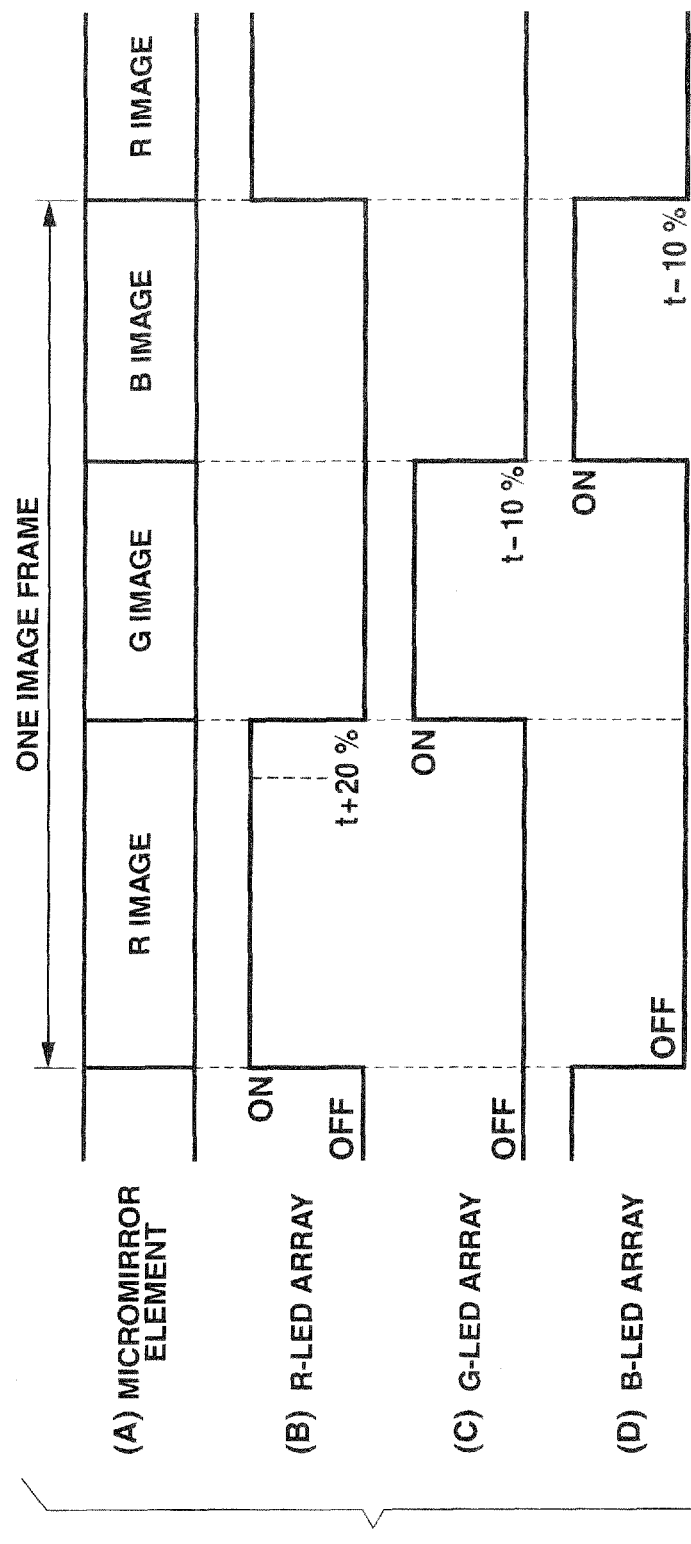
FIG. 7 is a timing chart to explain operation timing of the light source and image display element according to the first embodiment.

FIG. 7 shows a setting example when one of four LEDs constituting P-LED array 41 is short-circuited and the number of LEDs functioning normally is 3, whereas there is no short circuit in G-LED array 42 and B-LED array 43.

Here, suppose k-LED array 41, C-LED array 42, and B-LED array 43 are driven sequentially so as to emit light in a time-division manner with a time ratio of 1.2:0.9:0.9 as shown by (B) to (D) in FIG. 7.

Specifically, in B-LED array 41, since the light-emitting period is 1.2 times the original period with ¾ of the original light-emitting luminance, the total luminescence amount in the R image period is 0.9 (=0.75×1.2). Therefore, although the light amount decreases by 25% because one of four LEDs malfunctions, an image can be projected with 90% of the light amount in a normal operation.

Since in each of C-LED array 42 and B-LED array 43, the light-emitting period is 0.9 times the original period with the light-emitting luminance in a normal operation, the total luminescence amount in each of the C and B image periods is 0.9 (=1×0.9). Therefore, an image can be projected with 90% of the light amount in a normal operation.

Accordingly, the luminescence amount of each of R, G, and B in one image frame is equal, enabling the image to be projected without losing a color balance.

The micromirror element 17 displays a red image, a green image, and a blue image sequentially in synchronization with the light-emitting timing of LED arrays 41 to 43 as shown by (A) in FIG. 7, which causes optical images formed by the reflected lights to be projected by the projection lens unit 39 onto a screen (not shown) serving as a projection object.

As described above in detail, with the data projector apparatus 30 where the circuit shown in FIG. 1 is provided for the LED arrays 41 to 43 and projection light processing unit 48 for each of R, G, and B, a short circuit in LED arrays, semiconductor light source elements connected in series, can be detected reliably although the circuit configuration is made as simple as possible. Therefore, according to the detection result, a projection operation can be performed with as high a brightness as possible without losing a color balance.

In FIG. 7, the light-emitting period of each of LED arrays 41 to 43 has been adjusted according to malfunction conditions. For example, when the luminescence amount of R-LED array 41 has decreased by 25%, if the micromirror element 17 is driven for display with the gray level of the full screen of each of a green image and a blue image being decreased by 25%, a projection operation can be performed without adjusting the light-emitting timing, that is, without changing the display timing of the micromirror element 17, and without losing a color balance.

Next, a circuit configuration of a light source device that replaces that of FIG. 1 will be explained with reference to FIG. 8.

Figure 8:
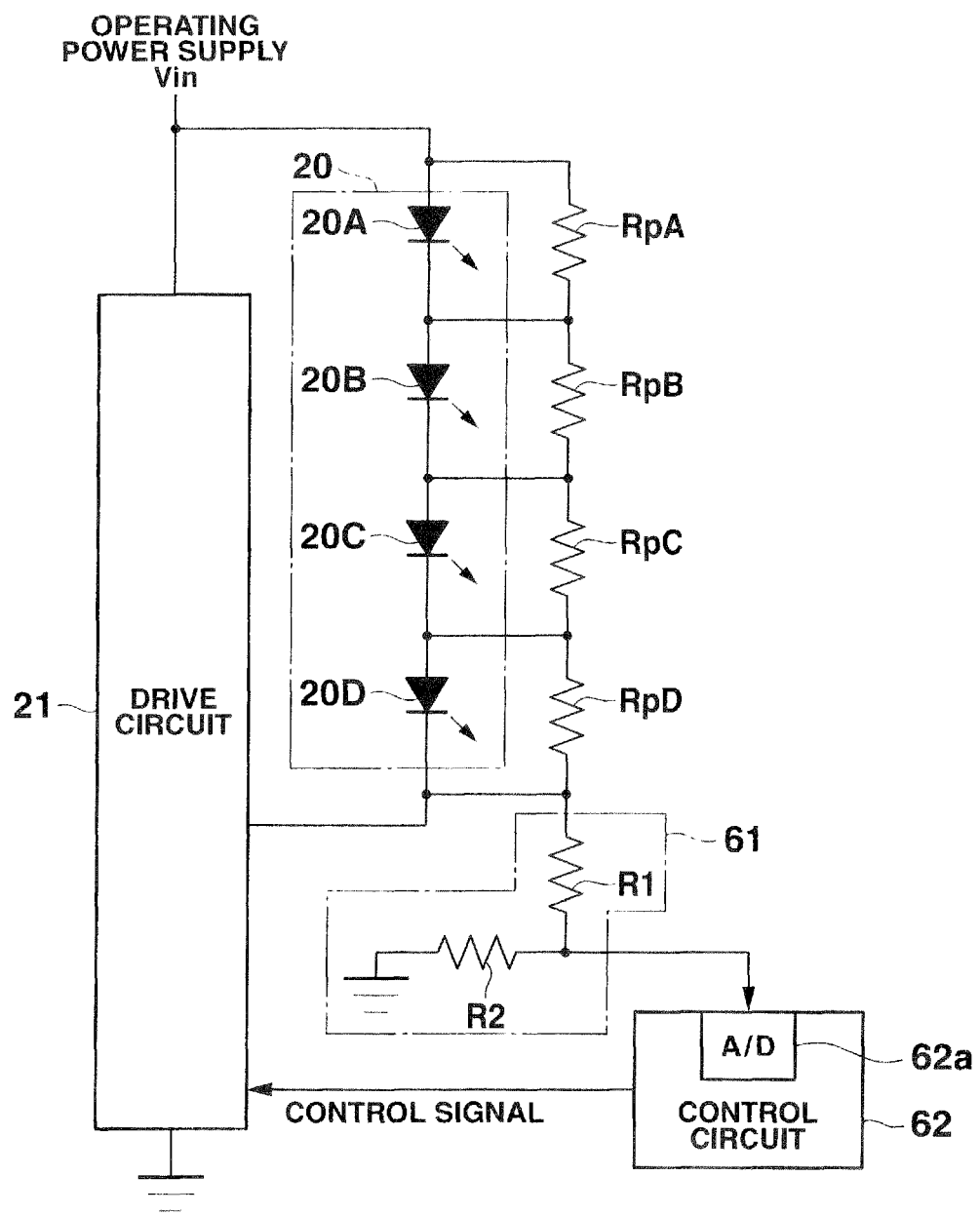
FIG. 8 shows another circuit configuration of the light source device according to the first embodiment.

FIG. 8 shows a circuit configuration of a light source device that drives a plurality of LEDs connected in series and detects a short circuit. In FIG. 8, a light source unit 20 to be detected, LEDs 20A to 20D constituting the light source unit 20, a drive circuit 21 that drives the light source unit 20, and resistors RpA to RpD connected in parallel with LEDs 20A to 20D respectively are the same as those of FIG. 1 in configuration. Therefore, they are indicated by the same reference symbols and an explanation of them will be omitted.

In place of the constant current source 22 of FIG. 1, a voltage dividing circuit 61 is used. The voltage dividing circuit 61 includes resistors R1 and R2 connected in series. One end of resistor R1 not connected to resistor R2 is connected to the cathode of LED 20D and one end of resistor RpD.

One end of resistor 22 not connected to resistor R1 is grounded. A midpoint between resistors R1 and R2 is connected as a voltage dividing point to a control circuit 62.

The control circuit 62 causes an analog-to-digital conversion unit 62a to digitize the voltage divided value of the voltage dividing circuit 61, determines the number of LEDs short-circuited in the light source unit 20 according to the voltage, and sends a control signal corresponding to the determination result to the drive circuit 21.

With the above circuit, configuration, the light source unit 20 can be applied in such a manner that a fluctuation in the operating power supply voltage Vin for driving the light source unit 20 has no effect on the accuracy of short circuit detection.

Use of this configuration enables a short circuit in semiconductor light source elements connected in series to be detected reliably with a remarkably simplified circuit configuration as compared with the circuit configuration of FIG. 1.

Second Embodiment

Hereinafter, referring to the accompanying drawings, a second embodiment of the invention will be explained in detail.

Figure 9:
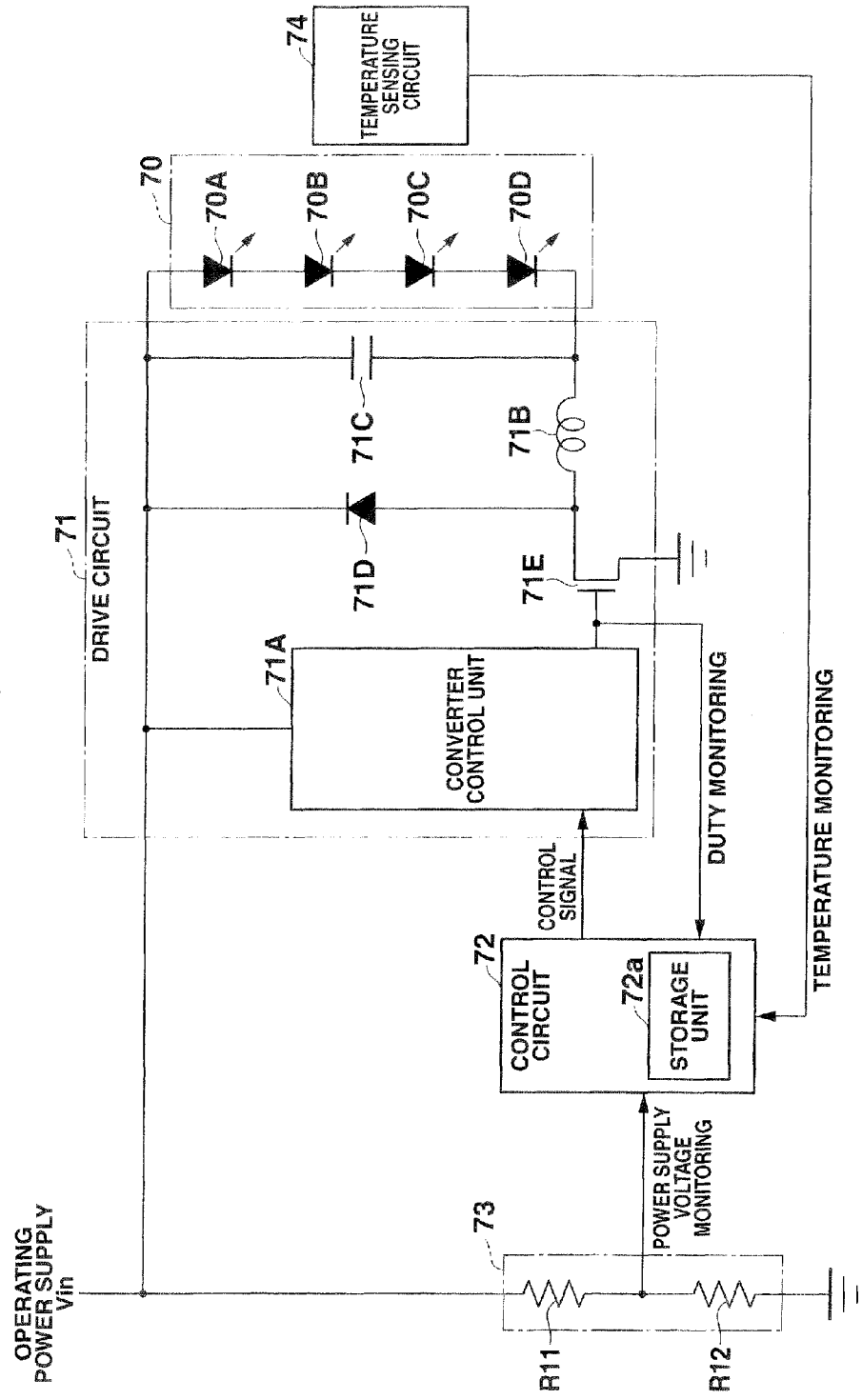
FIG. 9 shows a circuit configuration of a light source device according to a second embodiment of the invention.

FIG. 9 shows a circuit configuration of a light source device that drives a plurality of LEDs connected in series and detects a short circuit. In FIG. 9, a light source unit 70 to be driven includes a plurality of LEDs, for example, four LEDs 70A to 70D, connected in series.

An operating power supply voltage Vin is applied via a drive circuit 71 to the anode of LED 70A of the light source unit 70. The drive circuit 71 includes a step-down chopper DC/DC converter and a converter control unit 71A. The operating power supply voltage Vin is applied not only to the converter control unit 71A, the cathode of diode 71D, and one end of capacitor 71C in the drive circuit 71 but also to the anode of LED 70A of the light source unit 70 as described above.

In addition, the cathode of LED 70D of the light source unit 70 is connected to the other end of capacitor 71C and one end of reactance 71B in the drive circuit 71. The other end of the reactance 71B is connected to the anode of diode 71D and the drain of switching transistor 71E. The source of switching transistor 71E is grounded. The converter control unit 71 supplies an on/off signal to the gate of switching transistor 71E. The on/off signal output from the converter control unit 71A is fed back as a signal for monitoring the duty of the drive circuit 71 to a control circuit 72.

A voltage from a voltage diving circuit 73 that divides the operating power supply voltage Vin with resistors R11, R12 is input to the control circuit 72, which monitors the power supply voltage.

A temperature sensing circuit 74 that includes temperature sensor and a digitalization circuit is provided near the light source unit 70 and senses temperature when LEDs 70A to 70D of the light source unit 70 emit light. Temperature information sensed by the temperature sensing circuit 74 is also sent to the control circuit 72.

The control circuit 72, which is formed of, for example, a one-chip microcomputer, supervises a control operation of the light source device. The control circuit 72 includes a storage unit 72a that stores a power supply value via the voltage dividing circuit a duty ratio of the on/off signal from the drive circuit 71, and temperature information output by the temperature sensing circuit 74.

Next, an operation of the light source device will be explained.

The operating principle of the second embodiment will be explained.

Suppose the operating voltage of the light source unit 70 is Vop, the forward voltage of diode 71D is Vf, and the on voltage of switching transistor 71E is Vsat. The on duty Duty of switching transistor 71E is expressed by the following equation:

$$Duty = (Vop+Vf)/Vin - Vsat+Vf \quad (1)$$

In equation (1), Vf and Vsat are assumed to have much less effect than the other elements and therefore they are eliminated from equation (1), giving $$Duty \approx Vop/Vin \quad (2)$$

Changing equation (2) gives $$Vop \approx Vin \times Duty \quad (3)$$

Figure 13:
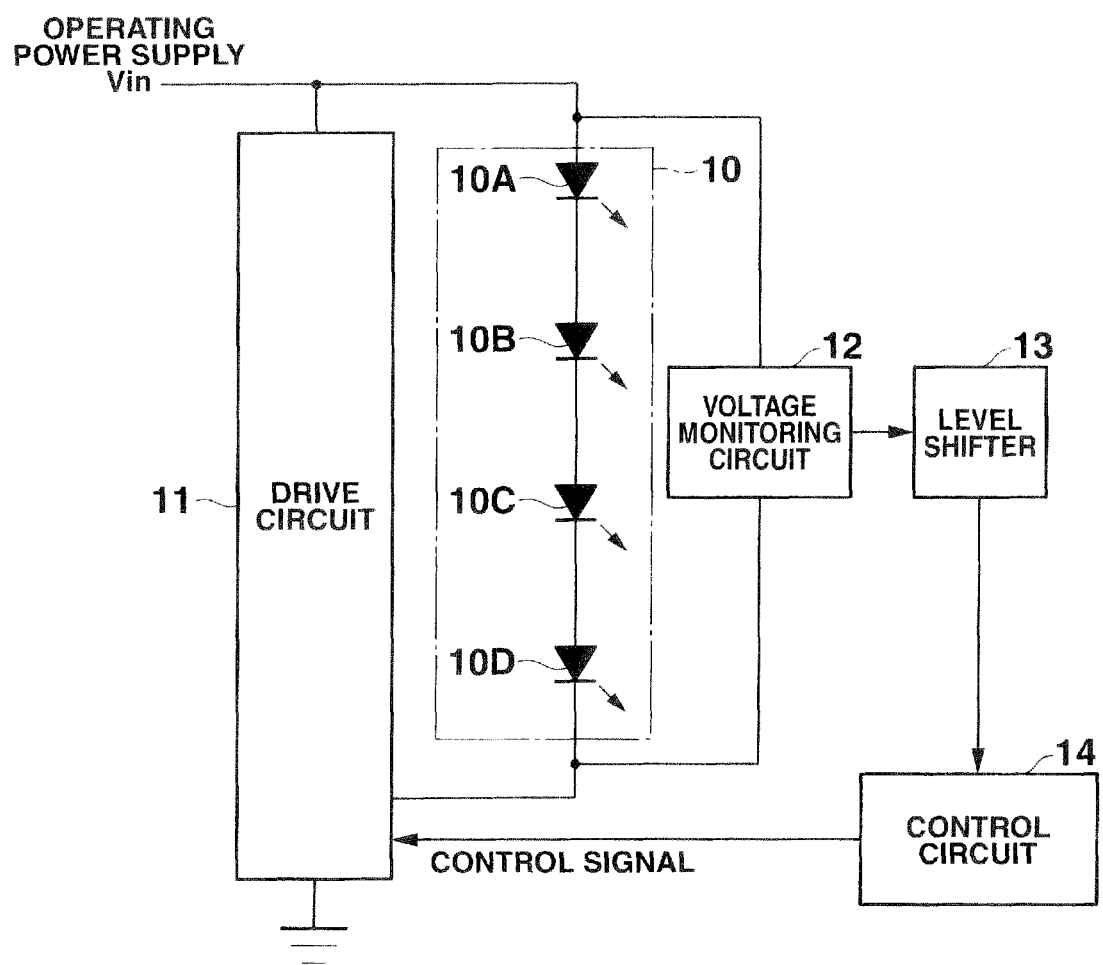
FIG. 13 is a block diagram showing the configuration of a control circuit of a general semiconductor light source device.
Figure 14:
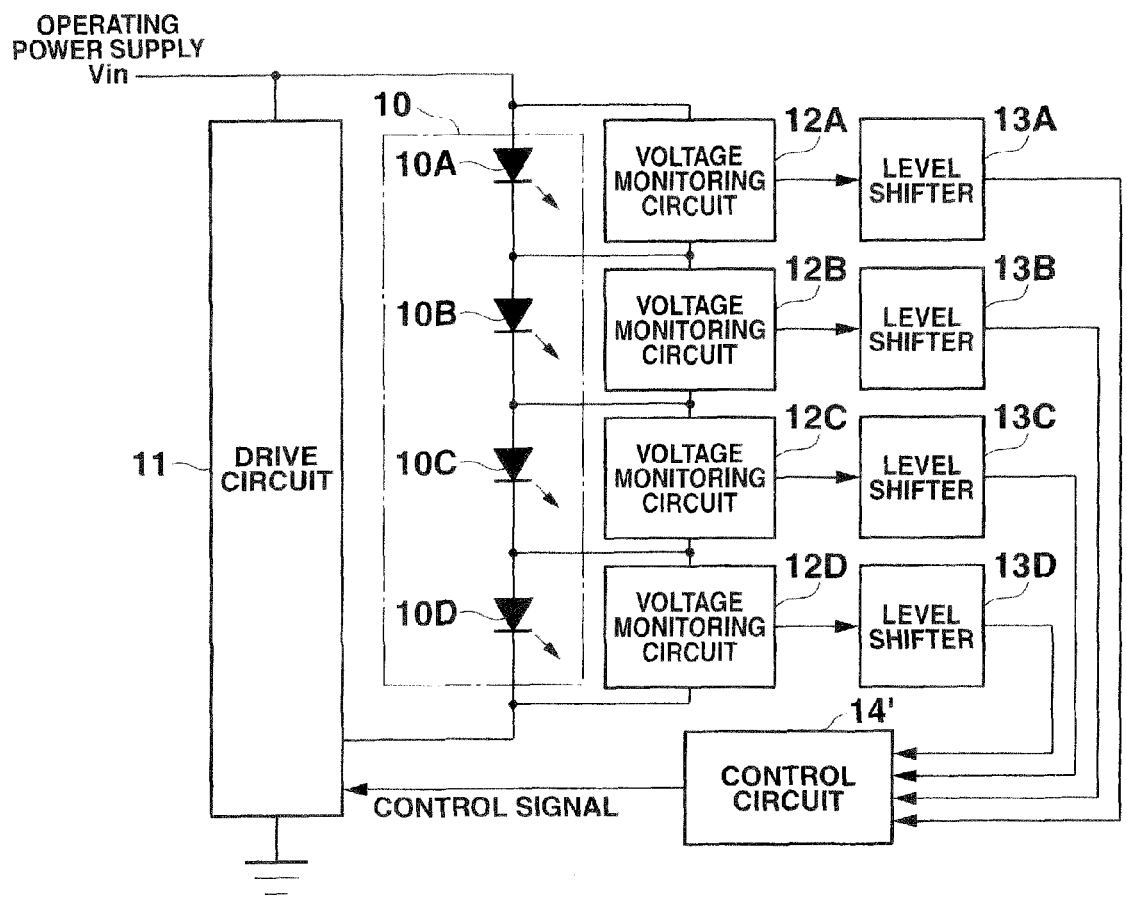
FIG. 14 is a block diagram showing the configuration of a control circuit of a general semiconductor light source device.

Therefore, if the operating power supply voltage Vin is constant, a fluctuation in voltage Vop of the light source unit 70 caused by a short circuit or the like in LEDs 70A to 70D can be determined easily and very accurately from a fluctuation in the duty of the on/off signal output from the drive circuit 71 without using a complicated circuit that converts an analog signal into a digital signal and a detection process as shown in FIG. 13. In addition, once the power supply voltage Vin is known, the voltage Vop of the light source unit 70 can be calculated easily.

Next, a concrete control process mainly performed by the control circuit 72 will be explained.

Figure 10:
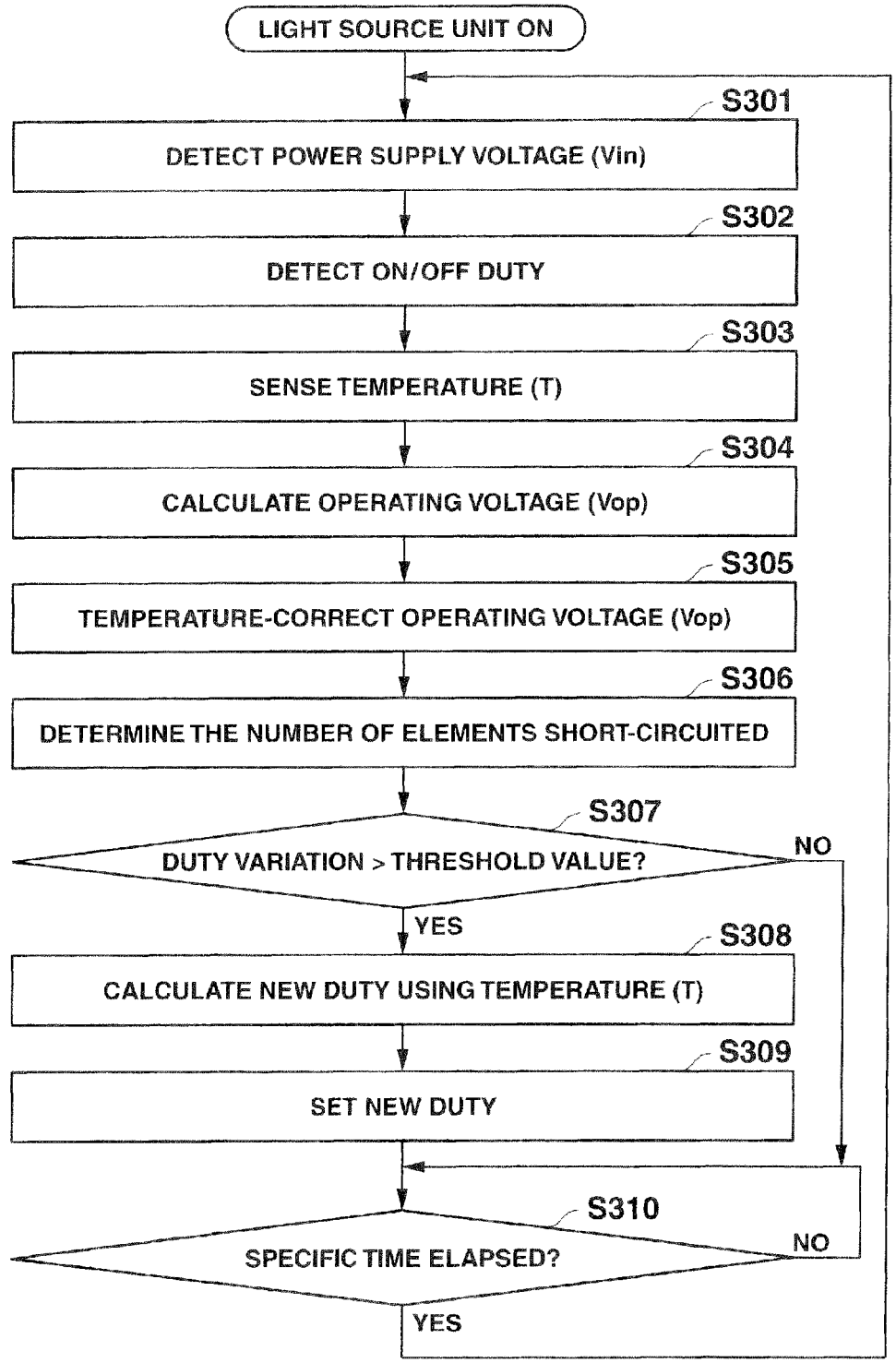
FIG. 10 is flowchart to explain processes performed by the light source device of the second embodiment.

FIG. 10 is a flowchart to explain a process performed by the control circuit 72, a one-chip microcomputer, in a light-emitting operation when the light source unit 70 is driven after power has been supplied to the light source device.

Here, suppose, before the control circuit 72 operates, the storage unit 72a of the control circuit 72 has stored the operating power supply voltage Vin in the initial normal light-emitting state, the duty of the on/off signal from the converter control unit 71A to switching transistor 71E, and correction equation data using detected temperature from the temperature sensing circuit 74 for the operating voltage Vop of the light source unit 70 or a look-up table for correction.

At toe beginning of processing in FIG. 10, the control circuit 72 detects a power supply voltage Vin divided by the voltage diving circuit 73 and stores the voltage Vin in the storage unit 72a (step S301).

Next, the control circuit 72 detects the duty of the on/off signal sent from the converter control unit 71A of the drive circuit 71 to switching transistor 71E (step S302). Specifically, the control circuit 72 measures the on time of the on/off signal and uses the proportion of the on time in an alternating-current lighting period (constant) of the light source unit 70 as a duty.

In addition, the control circuit 72 detects temperature information T in the light source unit 70 from the temperature sensing circuit 74 (step S303).

Next, the control circuit 72 calculates the operating voltage Vop of the light source unit 70 from the operating power supply voltage Vin and the duty using equation (3) (step S304).

Furthermore, an exact operating voltage Vop is determined by correcting the calculated operating voltage Vop of the light source unit 70 according to temperature drift quantities of LEDs 70A to 70D on the basis of a preset correction equation or a look-up table using temperature information T detected by the temperature sensing circuit 74 (step S305).

Then, on the basis of the obtained operating voltage Vop, the number of elements short-circuited in LEDs 70A to 70D constituting the light source unit 70 is determined (step S306).

Thereafter, the duty of the on/off signal detected in the preceding step S302 is compared with the normal duty stored in the storage unit 72a, thereby determining whether a fluctuation in the duty has exceeded a preset threshold value (step S307).

Only when it has been determined that the fluctuation in the duty has exceeded the threshold value significantly, a calculation is done on the basis of the temperature information on the light source unit 70 sensed in step S303 to correct the duty of the on/off signal output by the converter control unit 71A to switching transistor 71S (step S308).

Then, a control signal is output to the converter control unit 71A so as to cause the converter control unit 71A to output an on/off signal with a calculated new duty (step S309).

Thereafter, after a predetermined time has elapsed (step S310), control returns to the processes, starting at step S301, regardless of whether or not the processes in steps S308 and S309 have been performed.

As described above, with the second embodiment, since neither such a circuit as level-shifts a voltage applied to the light source unit 70 nor such a conversion circuit as converts an analog voltage signal into a digital signal is used at all, a short circuit in semiconductor light source elements connected in series can be detected very accurately with as simple a circuit configuration as possible without causing a detection error in the aforementioned circuits at all.

Furthermore, in the second embodiment, the temperature of the light source unit 70 is monitored with the temperature sensing circuit 74 and, on the basis of the monitoring result, the operating voltage is corrected and then the number of elements short-circuited in LEDs 70A to 70D is determined. Therefore, the accuracy of the detection of a short circuit in semiconductor light source elements connected in series can be increased further.

In addition, it is conceivable that the light source unit 70 and its peripheral circuitry shown in FIG. 9 are used as a light source of, for example, a DLP (registered trademark) data projector apparatus. In that case, a schematic functional configuration of the data projector apparatus is almost the same as that of FIG. 4. Therefore, a diagrammatic representation and explanation of the data projector apparatus will be omitted.

Even with the data projector apparatus, the control processes explained in FIG. 6 can be performed. In that case, the circuit shown in FIG. 9 is provided for the LED array and projection light processing unit for each of R, G, and B of the data projector apparatus of FIG. 4.

Therefore, a short circuit in the LED arrays can be detected very accurately by eliminating detection errors as much as possible in the circuit that detects the operating voltage in each of the LED arrays connected in series with as simple a circuit configuration of the peripheral circuitry of the LED array as possible. Therefore, according to the detection result, a projection operation can be performed with as high a brightness as possible without losing a color balance.

Third Embodiment

Hereinafter, a third embodiment of the invention will be explained in detail with reference to the accompanying drawings.

Figure 11:
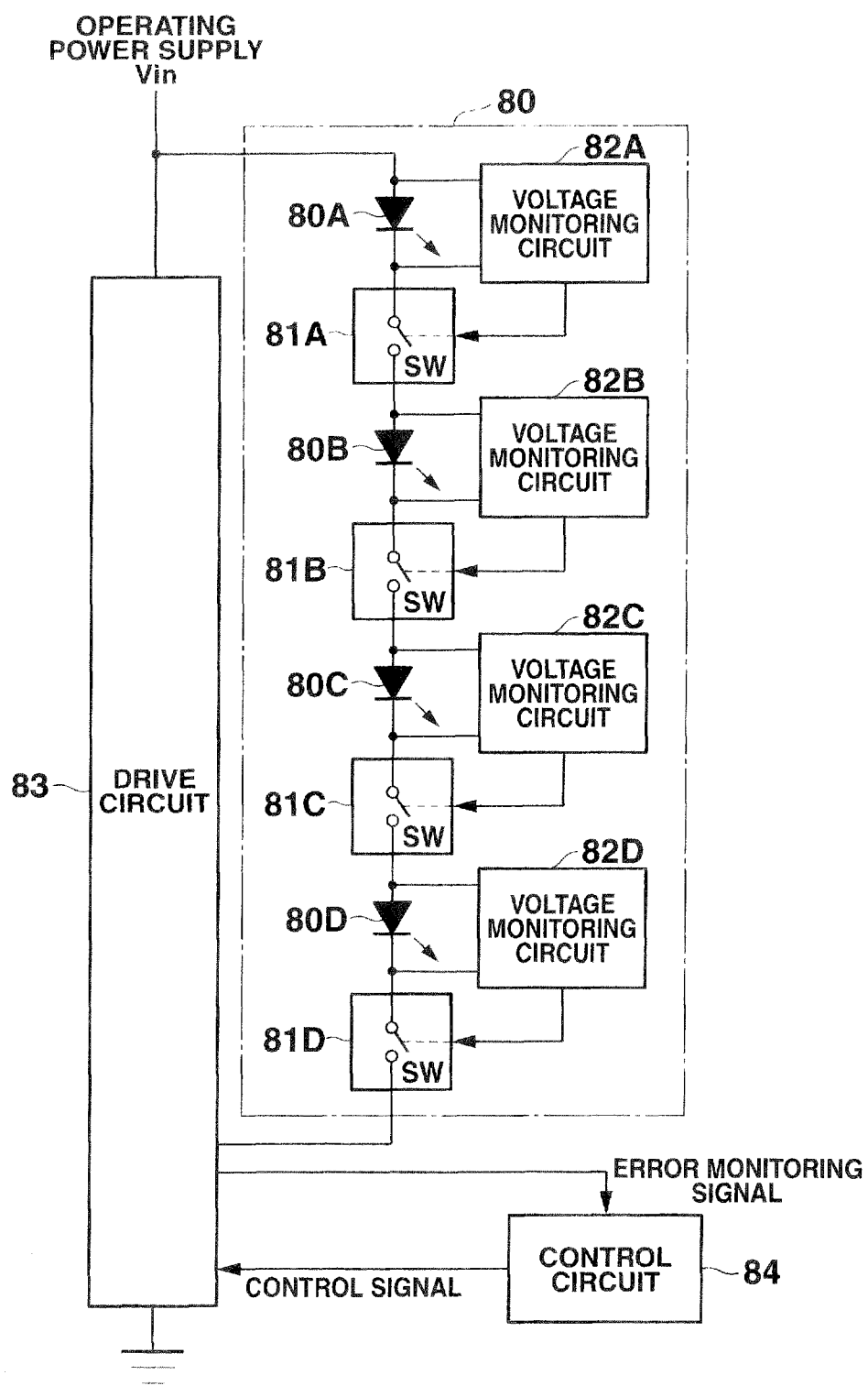
FIG. 11 shows a configuration of an electric circuit of a light source device according to a third embodiment of the invention.

FIG. 11 shows a circuit configuration of a light source device that drives a plurality of LEDs connected in series and detects a short circuit. In FIG. 11, a light source unit 80 to be driven includes a plurality of LEDs, for example, four LEDs 80A to 80D, and open-close switches 81A to 81D on the cathode side of the respective LEDs 80A to 80D connected in series.

Voltage monitoring circuits 82A to 82O are connected in parallel with LEDs 80A to 80D, respectively. The voltage monitoring circuits 82A to 82D detect a short circuit from the voltage between both ends of the corresponding one of LEDs 80A to 80D and, according to the detection result, performs open-close control of the corresponding open-close switches 81A to 81D.

Then, an operating power supply voltage Vin is applied to the anode of LED 80A of the light source unit 80. The operating power supply voltage Vin is also applied to a drive circuit 83 that drives the light source unit 80.

The drive circuit 83, which is also connected to the cathode of LED 80D of the light source unit 80, adjusts the voltage and current of the light source unit 80 so as to drive the light source unit 80 in an intended light quantity.

In addition, a control circuit 84 is connected to the drive circuit 83. The control circuit 84 receives an error monitoring signal from the light source unit 80 and, according to the contents of the signal, sends a control signal that controls the operation of drive circuit 83.

Figure 12:
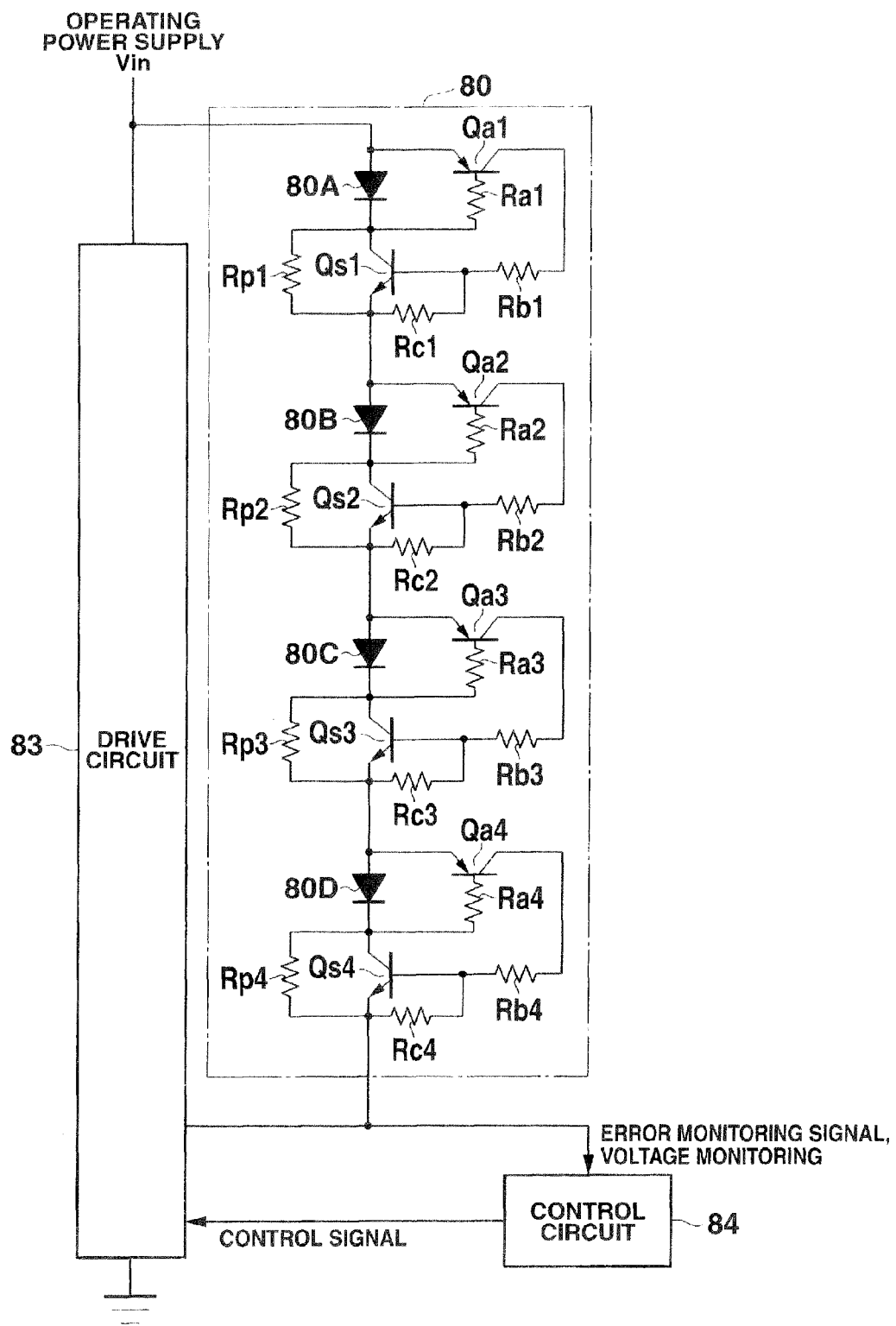
FIG. 12 shows a configuration of a functional circuit of the light source device according to the third embodiment.

FIG. 12 shows a concrete circuit configuration of the light source unit 80.

The anode of LED 80A of the light source unit 80 is connected to the emitter of pnp transistor Qa1. The base of transistor Qa1 is connected to the cathode of LED 80A via resistor Pa1. The collector of transistor Qa1 is connected to the base of npn transistor Qs1 via resistor Rb1.

Resistor Rc1 is connected between the base and emitter of transistor Qs1. Resistor Rp1 is connected between the collector and emitter of transistor Qs1.

Transistor Qa1 and resistor Ra1 constitute the voltage monitoring circuit 82A of FIG. 11. Transistor Qs1 and resistors Rb1, Rc1, and Rp1 constitute the open-close switches 81A to 81D.

The circuit configuration of each of the voltage monitoring circuits 82B to 82D for LEDs 80B to 80D and the open-close switches 81B to 81D is the same as described above. Therefore, a redundant explanation of them will be omitted.

The emitter of transistor Qs4 constituting open-close switch 81D is connected to the drive circuit 83 and further connected as a transmission path of an error monitoring signal to the control circuit 84.

According to the error monitoring signal from the drive circuit 83, the control circuit 84 monitors the voltage at which the drive circuit 83 drives the light source unit 80.

Resistors Ra1 to Ra4 connected to the bases of transistors Qa1 to Qa4 respectively and resistors Rb1 to Rb4 connected to the bases of transistors Qs1 to Qs4 respectively are inserted to limit the base currents in the corresponding transistors.

Resistors Rc1 to Rc4 connected between the base and emitter of transistors Qs1 to Qs4 respectively are inserted to bypass the base current to prevent transistors Qs1 to Qs from being turned on by leak currents or the like when transistors Qs1 to Qs4 are off.

Furthermore, resistors Rp1 to Rp4 connected between the collector and emitter of transistors Qs1 to Qs4 respectively are inserted to cause a base current to flow to turn on the individual transistors Qs1 to Qs4. At the same time, the resistance is set such that it prevents an intended current to drive LEDs 80A to 80D, light source elements, from flowing.

Next, an operation of the light source device will be explained.

In the initial state where the light source unit 80 is not driven, no voltage is generated between both ends of each of LEDs 80A to 80D and therefore no base current flows in transistors Qa1 to Qa4 and therefore transistors Qa1 to Qa4 are off. Therefore, no base current is supplied to the base of transistors Qs1 to Qs4 and transistor Qs1 to Qs4 are off.

When the control circuit 84 sends a drive start signal to the drive circuit 83, the drive circuit 83 drives the light source unit 80 so as to generate a driving voltage between both ends of the light source unit 80.

Since LEDs 80A to 80D of the light source unit 80 are connected in series via resistors Rp1 to Rp4, current starts to flow, generating voltages across resistors Rp1 to Rp4. The voltages cause base currents to flow in transistors Qa1 to Qa4.

When transistors Qa1 to Qa4 are turned on, causing base currents to flow in transistors Qs1 to Qs4, which turn on transistors Qs1 to Qs4. As a result, both ends of each of resistors Rp1 to Rp4 for startup are short-circuited. Therefore, low-resistance LEDs 80A to 80D are connected in series with the drive circuit 83, with the result that the drive current 83 increases the current to an intended driving current and LEDs 80A to 80D light up with a desired luminance all over the light source unit 80.

Consider a case where, for example, a short circuit has occurred in LED 80E with LEDs 80A to 80D lighting up.

If LED 80B is short-circuited, the voltage between both ends of LED 80B drops close to almost 0. Therefore, no base current is supplied to transistor Qa2 and therefore transistor Qa2 is turned off. When transistor Qa2 is turned off, no base current is supplied to the corresponding transistor Qs2. Therefore, transistor Qs2 is also turned off.

Accordingly, the cathode of LED 80B is connected via resistor Rp2 to the anode of LED 80C, with the result that current flowing through the entire light source unit 80 is limited and decreased greatly by the voltage drop across resistor Rp2.

When the current flowing through the entire light source unit 80 has decreased, the drive circuit 83 performs control so as to raise the voltage between both ends of the light source unit 80 to adjust the current to an intended driving current. However, since the current cannot be increased sufficiently, the voltage between both ends of the light source unit 80 rises to nearly the operating power supply voltage Vin or to a maximum voltage, protective function (not shown) limits the maximum voltage.

As a result, the voltage of a voltage monitoring point input to the control circuit 84 drops extremely below a voltage in a normal lighting operation. Therefore, the voltage difference between them is monitored as an error monitoring signal, which enables a failure caused by a short circuit in LEDs to be detected reliably.

The above operations are the same as when the load on the drive circuit 83 is removed. If the drive circuit 83 has the function of detecting an error in the removal of load, the technique of the third embodiment enables a failure due to a short circuit in LEDs 80A to 80D to be detected accurately and easily.

Here, the detailed circuit configuration and elements and the error detection method based on voltage explained in FIG. 12 are one example of the third embodiment. Other circuit elements and other methods may be employed, provided that they produce the same effect.

While in the first to third embodiments, a light source unit includes four LEDs connected in series has been used to simplify the explanation, the invention is not limited to this. For instance, laser diodes (LDs) may be used as other semiconductor light source elements. In addition, the number of semiconductor light source elements connected in series is not limited.

Furthermore, while in the first and second embodiments, each light source device has been applied to a data projector apparatus, a light source having semiconductor light source elements connected in series may be applied to other devices, including traffic lights, various lamps and head lights of cars, and backlights of liquid-crystal displays.

This invention is not limited to the above embodiments and, on the basis of available skills in the present or future implementation phase, may be practiced or embodied in still other ways without departing from the spirit or character thereof. The functions executed in the embodiments may be combined as much suitably as possible. The embodiments include inventions of different stages and therefore various inventions can be extracted by combining suitably a plurality of structural requirements disclosed in the embodiments. For example, even if some are removed from all of the structural requirements shown in the embodiments, the resulting configuration can be extracted as an invention, provided that the effect of the invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor light source device comprising:
   a plurality of semiconductor light source elements connected in series;
   a drive circuit configured to drive the semiconductor light source elements;
   a plurality of resistors, each of which is connected in parallel with one of the semiconductor light source elements, respectively; and
   a determination unit configured to determine the number of elements short-circuited in the semiconductor light source elements based on voltages applied to the resistors when driving of each of the semiconductor light source elements is being stopped.

2. The semiconductor light source device according to claim 1, further comprising:
   a constant current source configured to cause a current to flow in the resistors when driving of each of the semiconductor light source elements is being stopped; and
   a voltage monitoring unit configured to measure voltages applied to all of the resistors while the constant current source is causing the current to flow,
   wherein the determination unit determines the number of elements short-circuited in the semiconductor light source elements based on the voltages measured by the voltage monitoring unit.

3. The semiconductor light source device according to claim 2, wherein the resistors and the constant current source are set such that a voltage applied to each of the semiconductor light source elements when the constant current source supplies a current to the resistors is lower than an operating threshold voltage of each of the semiconductor light source elements.

4. The semiconductor light source device according to claim 2, wherein the current flowed by the constant current source is set such that a voltage applied to all of the semiconductor light source elements is higher than a voltage in which (i) the largest value of variations in the voltages applied to the resistors and (ii) the number of the semiconductor light source elements connected in series are multiplied.

5. The semiconductor light source device according to claim 1, further comprising a voltage dividing circuit configured to divide voltages applied to the resistors in a preset ratio when driving of each of the semiconductor light source elements is being stopped,
   wherein the determination unit determines the number of elements short-circuited in the light source elements based on the voltages divided by the voltage dividing circuit.

6. The semiconductor light, source device according to claim 1, wherein the semiconductor light source device includes an LED or an LD.

7. A method of controlling a semiconductor light source device that includes a plurality of semiconductor light source elements connected in series and a drive circuit configured to drive the semiconductor light source elements, the method comprising:
   connecting each of a plurality of resistors in parallel with one of the semiconductor light source elements, respectively; and
   determining the number of elements short-circuited in the semiconductor light source elements based on voltages applied to the resistors when driving of each of the semiconductor light source elements is being stopped.

8. The method according to claim 7, further comprising:
   making a constant current source cause a current to flow in the resistors when driving of each of the semiconductor light source elements is being stopped;
   measuring voltages applied to all the resistors while the constant current source is causing the current to flow; and
   determining the number of elements short-circuited in the semiconductor light source elements based on the measured voltages.

9. The method according to claim 8, wherein the resistors and the constant current source are set such that a voltage applied to each of the semiconductor light, source elements when the constant current source supplies a current to the resistors is lower than an operating threshold voltage of each of the semiconductor light source elements.

10. The method according to claim 8, wherein the current flowed by the constant current source is set such that a voltage applied to all of the semiconductor light source elements is higher than a voltage in which (i) the largest value of variations in the voltages applied to the resistors and (ii) the number of the semiconductor light source elements connected in series are multiplied.

11. The method according to claim 7, further comprising:
    dividing voltages applied to the resistors in a preset ratio when driving of each of the semiconductor light source elements is being stopped; and
    determining the number of elements short-circuited in the light source elements based on the divided voltages.

12. The method according to claim 7, wherein the light source element includes an LED or an LD.

13. A projection apparatus comprising:
    a light source configured to perform light-emitting driving of a plurality of semiconductor light source arrays in time division each of which includes a plurality of semiconductor light source elements connected in series and emits light of a different color;
    an input unit configured to input an image signal;
    a projection unit configured to cause a display element to display an image based on an image signal input by the input unit, cause the display element to reflect or transmit light of a plurality of colors input from the light source in time division so as to form a color optical image, and project the optical image onto a projection object;

a plurality of resistors, each of which is connected in parallel with one of the semiconductor light source elements included in each of the semiconductor light source element arrays, respectively; and a plurality of determination units configured to determine the number of elements short-circuited in the semiconductor light source elements based on voltages applied to the resistors when driving of each of the light source element arrays is being stopped; and a projection control unit configured to adjust at least one of the light source and the projection unit according to a determination result at the determination units.

14. The projection apparatus according to claim 13, further comprising:

a constant current source provided for each of the semiconductor light source element arrays and configured to cause a current to flow in the resistors when driving of each of the light source element arrays is being stopped; and a plurality of voltage monitoring units, each of which, is provided for one of the semiconductor light source element arrays, respectively, each of the voltage monitoring units being configured to measure a voltage applied across a corresponding one of the semiconductor light source element arrays while the constant current source is causing the current to flow;

wherein the determination unit determines the number of elements short-circuited in each of the semiconductor light source element array based on the voltages measured by the voltage monitoring units.

15. The projection apparatus according to claim 14, wherein the resistors and the constant current source are set such that a voltage applied to each of the semiconductor light source elements when the constant current source supplies a current to the resistors is lower than an operating threshold voltage of each of the semiconductor light source elements.

16. The projection apparatus according to claim 14, wherein the current flowed by the constant current source is set such that a voltage applied to all of the semiconductor light source elements is higher than a voltage in which (i) the largest value of variations in the voltages applied to the resistors and (ii) the number of the semiconductor light source elements connected in series are multiplied.

17. The projection apparatus according to claim 13, further comprising a voltage dividing circuit configured to divide voltages applied to the resistors in a preset ratio when driving of each of the semiconductor light source elements is being stopped, wherein the determination unit determines the number of elements short-circuited in the semiconductor light source elements based on the voltages divided by the voltage dividing circuit.

18. The projection apparatus according to claim 13, wherein the light source element includes an LED or an LD.

* * * * *